(12) United States Patent
Lee

(10) Patent No.: US 10,081,231 B2
(45) Date of Patent: Sep. 25, 2018

(54) STRUCTURE FOR FIXING DELTA GLASS FOR VEHICLE

(71) Applicant: Hyundai Motor Company, Seoul (KR)

(72) Inventor: Sang Jin Lee, Gyeongsangbuk-do (KR)

(73) Assignee: Hyundai Motor Company, Seoul (KR)

( * ) Notice: Subject to any disclaimer, the term of this patent is extended or adjusted under 35 U.S.C. 154(b) by 128 days.

(21) Appl. No.: 15/203,347

(22) Filed: Jul. 6, 2016

(65) Prior Publication Data

US 2017/0057329 A1  Mar. 2, 2017

(30) Foreign Application Priority Data

Aug. 28, 2015 (KR) .......................... 10-2015-0121424

(51) Int. Cl.
*B60J 5/00* (2006.01)
*B60J 5/04* (2006.01)
*B60J 1/00* (2006.01)
*B60J 1/10* (2006.01)
*B60R 13/04* (2006.01)

(52) U.S. Cl.
CPC ............... *B60J 5/045* (2013.01); *B60J 1/008* (2013.01); *B60J 1/10* (2013.01); *B60R 13/04* (2013.01)

(58) Field of Classification Search
CPC ........ B60J 5/045; B60J 5/0401; B60J 5/0402; B60J 5/0406; B60J 5/0408; B60J 1/10; B60J 1/008; B60R 13/04
See application file for complete search history.

(56) References Cited

U.S. PATENT DOCUMENTS

| | | | | |
|---|---|---|---|---|
| 2,797,130 | A | * | 6/1957 | Renno ................... B60J 5/0412 49/502 |
| 3,961,821 | A | * | 6/1976 | Mistopoulos, Jr. ........ B60J 1/10 248/208 |
| 5,168,670 | A | * | 12/1992 | Umeda ...................... B60J 1/10 49/502 |
| 5,787,646 | A | * | 8/1998 | Nakamori .............. B60J 5/0412 29/467 |

(Continued)

FOREIGN PATENT DOCUMENTS

JP   H10193967 A   7/1998
JP   2003-104057 A   4/2003

(Continued)

*Primary Examiner* — Katherine W Mitchell
*Assistant Examiner* — Abe Massad
(74) *Attorney, Agent, or Firm* — Mintz Levin Cohn Ferris Glovsky and Popeo, P.C.; Peter F. Corless

(57) ABSTRACT

A structure for fixing a delta glass for a vehicle is provided to fix and support a rear end portion of the glass on a door frame from which a C-pillar is omitted. The structure includes a delta outer reinforcing panel that is fixed on an upper portion of a door inner panel at a rear end portion of a door frame. A delta inner reinforcing panel is fixed to be positioned inside the delta outer reinforcing panel. A rear channel is installed between the delta outer reinforcing panel and the delta inner reinforcing panel to allow a rear end portion of the delta glass to be inserted into and supported by the rear channel. Additionally, a delta garnish is installed to cover the outside of the delta outer reinforcing panel and the delta glass is fixed between the rear channel and a division channel installed on the door frame.

12 Claims, 18 Drawing Sheets

(56) References Cited

U.S. PATENT DOCUMENTS

| | | | |
|---|---|---|---|
| 7,845,713 B2* | 12/2010 | Terai | B60J 1/10 296/193.06 |
| 2007/0187988 A1* | 8/2007 | Koshimichi | B60J 10/24 296/146.9 |
| 2014/0284961 A1* | 9/2014 | Otake | B60J 5/0455 296/146.6 |
| 2015/0108785 A1* | 4/2015 | Yokota | B60J 5/0408 296/146.5 |
| 2015/0165881 A1* | 6/2015 | Bang | B60J 5/0418 296/146.2 |
| 2015/0251524 A1* | 9/2015 | Goto | B60J 5/0426 52/204.71 |

FOREIGN PATENT DOCUMENTS

| | | |
|---|---|---|
| JP | 2010-070054 A | 4/2010 |
| JP | 2010-234952 A | 10/2010 |
| KR | 10-2012-0136494 A | 12/2012 |
| WO | 2014-034219 A1 | 3/2014 |

\* cited by examiner

STRUCTURE FOR FIXING DELTA GLASS FOR VEHICLE

CROSS-REFERENCE TO RELATED APPLICATION

This application claims under 35 U.S.C. § 119(a) the benefit of Korean Patent Application No. 10-2015-0121424 filed on Aug. 28, 2015, the entire contents of which are incorporated herein by reference.

BACKGROUND (a) Technical Field

The present disclosure relates to a structure for fixing a delta glass for a vehicle, and more particularly, to a structure for fixing a delta glass capable of fixing and supporting a rear end portion of the delta glass on a door frame from which a C-pillar is omitted, to thus apply a delta glass type even to the door frame from which the C-pillar is omitted.

(b) Background Art

As well known in the art, a door glass is installed in a door of a vehicle, and a door outside belt molding is attached to a portion where the door glass is extended and retracted in the door. The door outside belt molding is installed at a position where the door glass and a door frame are separated, and prevents various types of noise from entering the interior of the vehicle through a space between the door glass and the door frame, and prevents foreign substances such as dust or rainwater from entering the interior of the vehicle.

A delta garnish is mounted at a rear end portion of a rear door for a passenger vehicle, and the delta garnish has an external appearance having a triangular shape like a Greek letter "Δ", and serves as a decoration when fixed to the door panel to improve an aesthetic design of the door, and serves to support a glass run that guides the upward and downward movements of the door glass.

FIG. 1 is a view illustrating an example in which the delta garnish in the related art is installed on a rear door, and FIG. 2 is a cross-sectional view taken along line A-A of FIG. 1. In the illustrated example, a C-pillar 12 of a door frame 11 of a rear door 10 is connected to a door inner panel (not illustrated) at a lower side, and a delta garnish 13 is assembled to the C-pillar 12 of the door frame 11 to be positioned at a rear end portion of the rear door 10.

The delta garnish 13 and a delta reinforcing panel 14 positioned inside the delta garnish 13 define a channel, and a glass run 15 is mounted and supported inside the channel. A rear end portion of the door glass 16 is inserted into the glass run 15, and when the rear end portion of the door glass 16 is inserted into the glass run 15 as described above, the glass run 15 guides the upward and downward movements of the door glass 16.

FIG. 3 is a view illustrating an example to which a delta glass is applied, and FIG. 4 is a cross-sectional view taken along line B-B of FIG. 3. As illustrated, when a delta glass type is applied, a division channel 17 is installed to be elongated in a vertical direction at a rear side of a door frame 11, and the glass run 15, into which a rear end portion of a door glass 16 is inserted and guided, is mounted at one side of the division channel 17.

The C-pillar 12 of the door frame 11 is coupled to a door inner panel (not illustrated), and a delta glass 19 is fixedly mounted between a rear channel 18 installed in the C-pillar 12 of the door frame 11 and the other side of the division channel 17. In particular, a front end portion of the delta glass 19 is inserted into and fixed to the division channel 17, and a rear end portion of the delta glass 19 is inserted into and fixed to the rear channel 18 installed in the C-pillar 12 of the door frame 11. A rear garnish 20 is installed extraneous to the C-pillar 12 of the door frame 11.

Moreover, as illustrated in FIG. 5, the shape of the door frame 11 and a shape of a vehicle body, which corresponds to the shape of the door frame 11, may be changed based on the vehicle type designed to have a door belt line is steeply raised upward at the rear end portion, and particularly, it may be difficult to apply the C-pillar to the door frame 11 in some instances. When the C-pillar (e.g., a portion where the rear channel is installed) which fixes the delta glass 19 together with the division channel 17 is not capable of being applied to the door frame 11, the aforementioned delta glass type cannot be applied.

In particular, FIG. 6 is a view illustrating a problem in the related art, which illustrates an example of a shape required for a side outer panel 6 of the vehicle body when the C-pillar has a steeply bent structure. The part of the side outer panel illustrated in FIG. 6 is a portion which corresponds to the door frame and abuts the door frame of the door when the door is closed at the vehicle body, and FIG. 6 illustrates an external appearance of the side outer panel 6 shown when the door is opened.

Referring to FIG. 6, a portion of the side outer panel 6, which is indicated by a circle, is steeply bent at a minimal angle. The shape of the side outer panel 6 is fixed when the side outer panel 6 has a structure in which the C-pillar is steeply bent from an upper frame that defines an upper portion of the door frame, and it may be difficult to form this shape using a mold during manufacturing of the side outer panel. When the door frame is designed to have a structure in which the C-pillar is steeply bent downward within a short section from the upper frame, that is, when a minimal angle is formed between the upper frame and the C-pillar, the side outer panel, which is a part of the vehicle body that corresponds to the upper frame and the C-pillar, is required to have a portion having a minimal angle as indicated by a circle in FIG. 6.

Since it may be difficult to form the shape of the side outer panel 6 having the steeply bent structure using a mold, the shape of the side outer panel 6 may not be actually applied, and it may also be impossible to apply the C-pillar having the steeply bent structure. In particular, since it may be impossible to apply the C-pillar having the steeply bent structure, it may also be impossible to install the delta glass. In other words, since it may be impossible to apply the C-pillar which fixes and supports the delta glass together with the division channel on the door frame, it may be impossible to implement the delta glass type.

The above information disclosed in this section is merely for enhancement of understanding of the background of the invention and therefore it may contain information that does not form the prior art that is already known in this country to a person of ordinary skill in the art.

SUMMARY

The present invention provides a structure for fixing a delta glass, which is configured to fix and support the delta glass on a door frame from which a C-pillar is omitted, to apply a delta glass type, instead of a delta garnish type, even to the door frame structure from which the C-pillar is omitted.

In one aspect, the present invention provides a structure for fixing a delta glass for a vehicle that may include: a delta outer reinforcing panel fixed on an upper portion of a door inner panel at a rear end portion of a door frame; a delta inner reinforcing panel fixed to be positioned inside the delta outer reinforcing panel; a rear channel installed between the delta outer reinforcing panel and the delta inner reinforcing panel to allow a rear end portion of the delta glass to be inserted into and supported by the rear channel; and a delta garnish installed to cover the exterior of the delta outer reinforcing panel, in which the delta glass may be fixed between the rear channel and a division channel installed on the door frame.

In an exemplary embodiment, when the delta outer reinforcing panel is positioned at a lower side of an upper frame, a protruding portion, which is joined and fixed to the upper portion of the door inner panel, may be formed at an upper end portion of the delta outer reinforcing panel. In addition, the door frame may have a structure in which an end portion of the upper frame of the door frame is cut at a rear end portion of the door frame, and an upper portion of the door inner panel may extend to surround the cut end portion of the upper frame and may be joined to the end portion of the upper frame.

Further, the door frame may have a structure in which an end portion of the upper frame of the door frame is cut at a rear end portion of the door frame, and the protruding portion of the delta outer reinforcing panel may be disposed to be positioned on an upper frame extended line that extends from the upper frame to the cut end portion. The protruding portion of the delta outer reinforcing panel may be formed in a plate shape, to join and fix the upper portion of the door inner panel to a first surface of the protruding portion, and to join and fix an upper portion of the door outer panel to a second surface of the protruding portion.

The structure may further include a guide bracket mounted on the door inner panel to support a lower end portion of the delta glass. In particular, the guide bracket may be installed at a height at which the rear end portion of the delta glass is inserted into the rear channel when the delta glass is moved rearward and the delta glass is seated at an upper side at the time of assembling the delta glass. The guide bracket may include a joint portion which is a portion joined and fixed to the door inner panel, and a support portion which has a shape bent at an upper side of the joint portion and on which the delta glass is seated.

Additionally, a fastening aperture for fastening a door outside belt molding may be formed in the delta outer reinforcing panel, to fasten and fix the delta outer reinforcing panel and the door outside belt molding through the fastening aperture. In addition, a tool entry aperture, into which a tool for fastening the door outside belt molding may be inserted to enter a space between the delta inner reinforcing panel and the delta outer reinforcing panel, may be formed in the delta inner reinforcing panel. The structure may further include a delta bracket which connects the delta outer reinforcing panel and the delta inner reinforcing panel.

In particular, the delta bracket may have a blocking portion which divides the space between the delta outer reinforcing panel and the delta inner reinforcing panel into an upper space and a lower space, and the blocking portion may be positioned at a lower side of the fastening aperture. A welding tool entry aperture, into which a welding tool for welding the delta bracket and the delta inner reinforcing panel may be inserted to enter the space between the delta inner reinforcing panel and the delta outer reinforcing panel, may be formed in the delta outer reinforcing panel. In addition, the welding tool entry aperture, into which a welding tool for welding the delta bracket and the delta outer reinforcing panel may be inserted to enter the space between the delta inner reinforcing panel and the delta outer reinforcing panel, may be formed in the delta inner reinforcing panel.

According to the structure for fixing a delta glass for a vehicle according to the present invention, the delta glass may be fixed and supported even on the door frame from which the C-pillar is omitted, and as a result, it may be possible to apply a delta glass type structure, and improve design characteristics, frame rigidity, and assembly properties.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
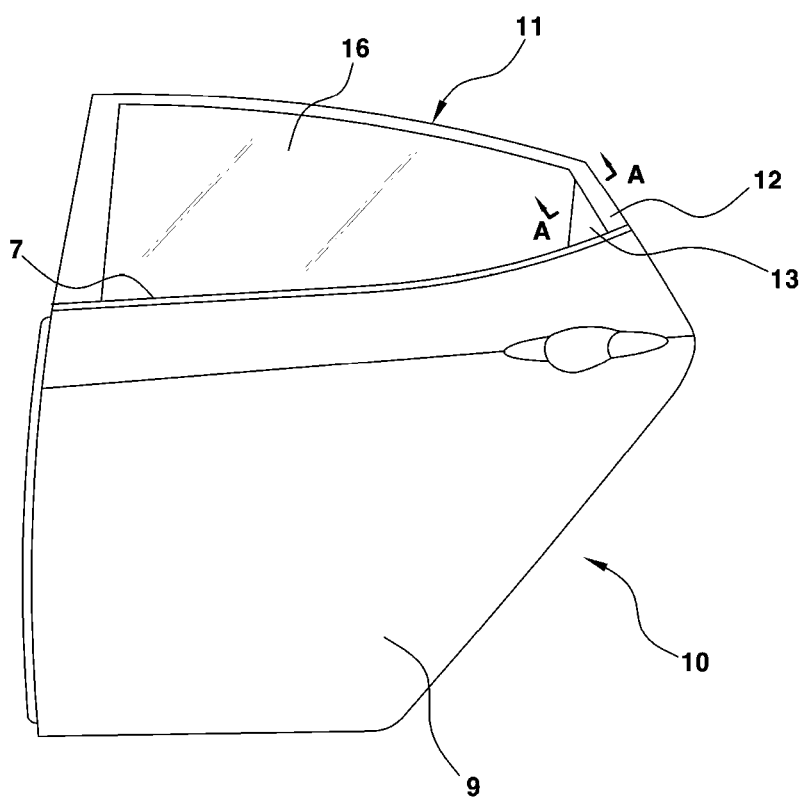
FIG. 1 is a view illustrating an example in which a delta garnish in the related art is installed on a rear door.
Figure 2:
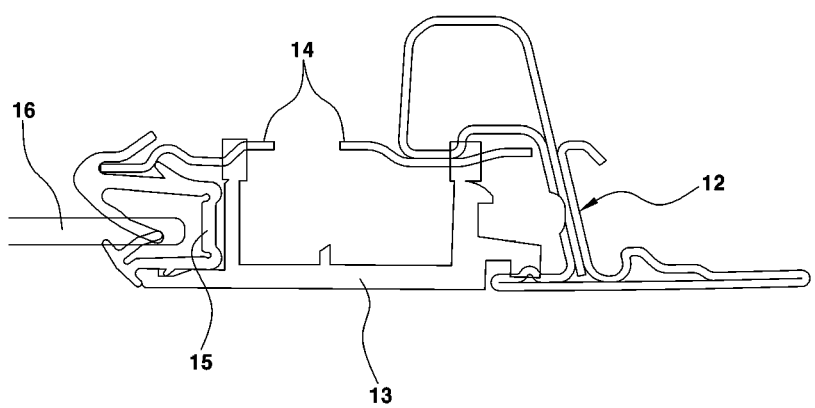
FIG. 2 is a cross-sectional view taken along line A-A of FIG. 1 according to the related art.
Figure 3:
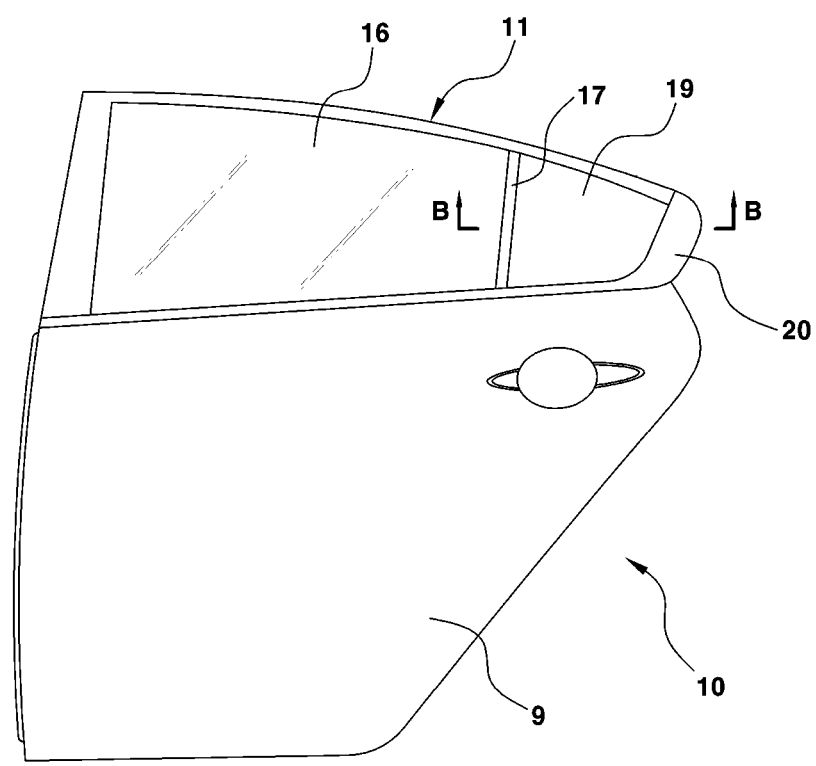
FIG. 3 is a view illustrating an example to which a delta glass in the related art is applied.
Figure 4:
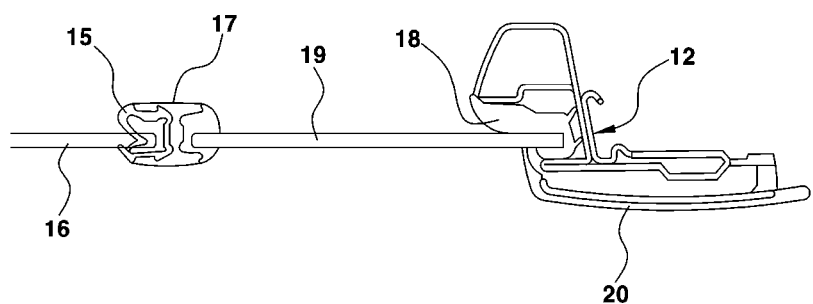
FIG. 4 is a cross-sectional view taken along line B-B of FIG. 3 according to the related art.

Reference numerals set forth in the Drawings includes reference to the following elements as further discussed below:

7: door outside belt molding (door belt)
8: door inner panel
9: door outer panel
10: rear door
11: door frame
11a: upper frame
12: C-pillar
13: delta garnish
14: delta reinforcing panel
15: glass run
16: door glass
17: division channel
17a: mounting bracket
18: rear channel
19: delta glass
20: rear garnish
30: delta outer reinforcing panel
31: protruding portion
32: fastening aperture
33: welding tool entry aperture
40: delta inner reinforcing panel
41: welding tool entry aperture
50: rear channel
60: delta garnish
70: delta bracket
71: aperture
72: joint portion
73: blocking portion
80: guide bracket
81: joint portion
82: support portion It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, exemplary embodiments of the present invention will be described in detail with reference to the accompanying drawings so that those skilled in the art to which the present invention pertains may easily carry out the exemplary embodiments.

The present invention relates to a structure for fixing a delta glass, and provides a structure capable of fixing and supporting a delta glass together with a division channel to a door frame from which a C-pillar is omitted, to allow a delta glass type to be applied even to a structure of the door frame from which the C-pillar is omitted. Accordingly, a fixing structure is disclosed which may support a rear end portion of the delta glass when a front end portion of the delta glass is inserted into and supported by the division channel on the door frame from which the C-pillar is omitted.

Figure 5:
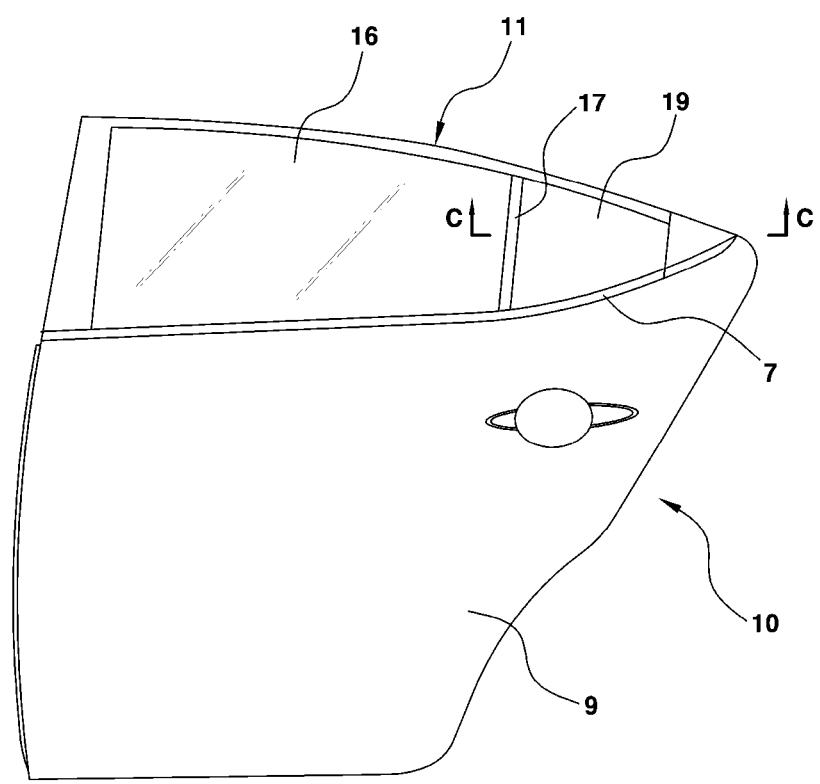
FIG. 5 is a view illustrating a problem in the related art, which illustrates an example in which a door belt line of the rear door is steeply raised upward at a rear end portion.
Figure 6:
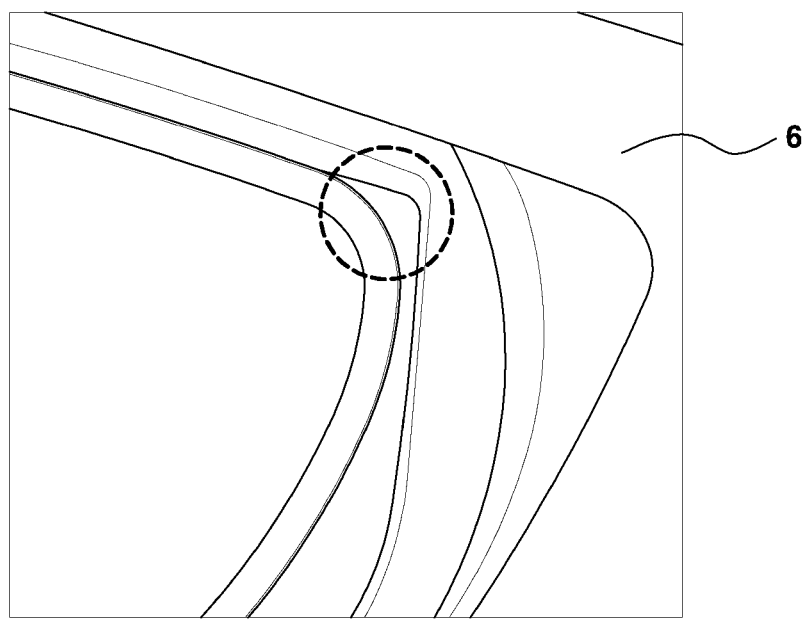
FIG. 6 is a view illustrating a problem in the related art, which illustrates an example of a shape required for a side outer panel of a vehicle body when a C-pillar has a steeply bent structure.
Figure 7:
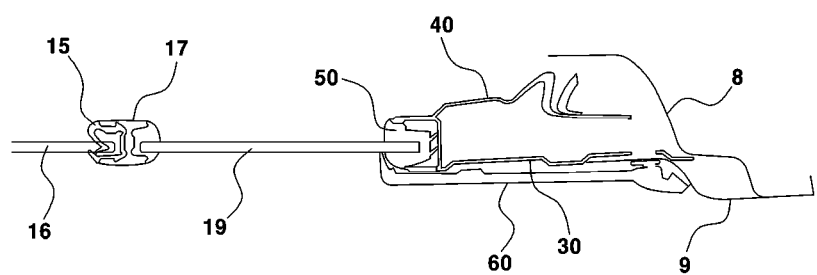
FIG. 7 is a cross-sectional view taken along line C-C of FIG. 5, which is a cross-sectional view of a portion where a fixing structure according to an exemplary embodiment of the present invention is applied.

As illustrated in FIG. 5, the present invention may be applied to a rear door 10 having a door belt line designed to be steeply raised upward from the rear end portion, and an external appearance of the rear door 10, to which the fixing structure according to the present invention is applied, will be described with reference to FIG. 5. FIG. 7 is a cross-sectional view taken along line C-C of FIG. 5, which is a cross-sectional view of a portion where the fixing structure according to the exemplary embodiment of the present invention is applied.

Figure 8A:
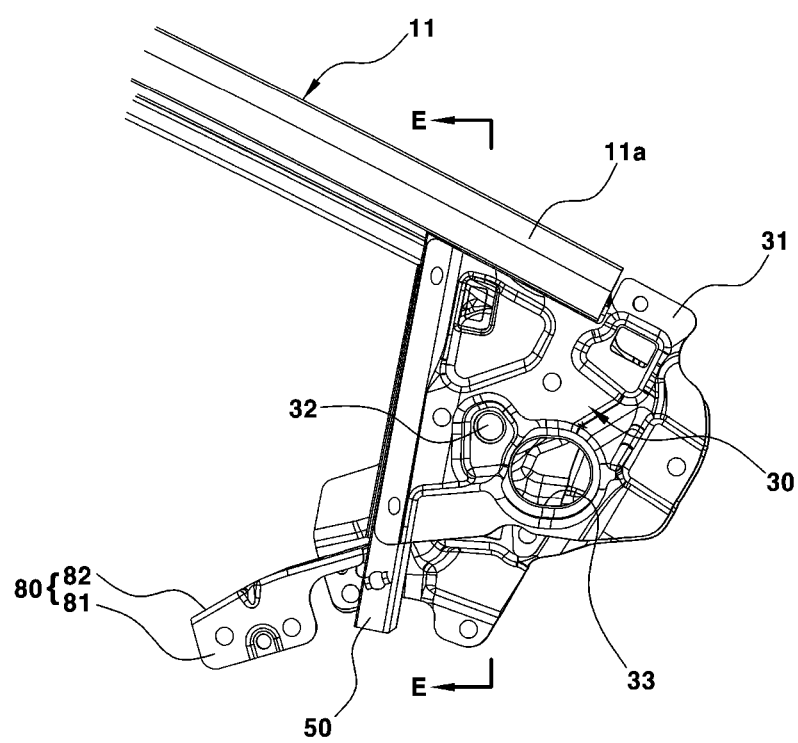
FIG. 8A is a view illustrating a state in which the fixing structure according to the exemplary embodiment of the present invention is installed when viewing from a door outside position toward the inside.
Figure 8B:
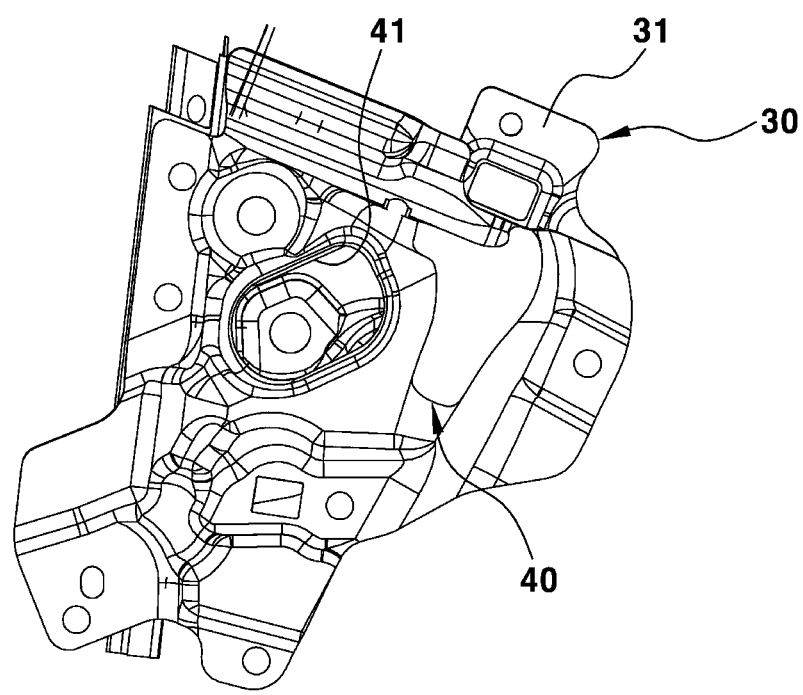
FIG. 8B is a view illustrating a state in which the fixing structure according to the exemplary embodiment of the present invention is installed when viewing from a door inside position toward the outside.
Figure 9A:
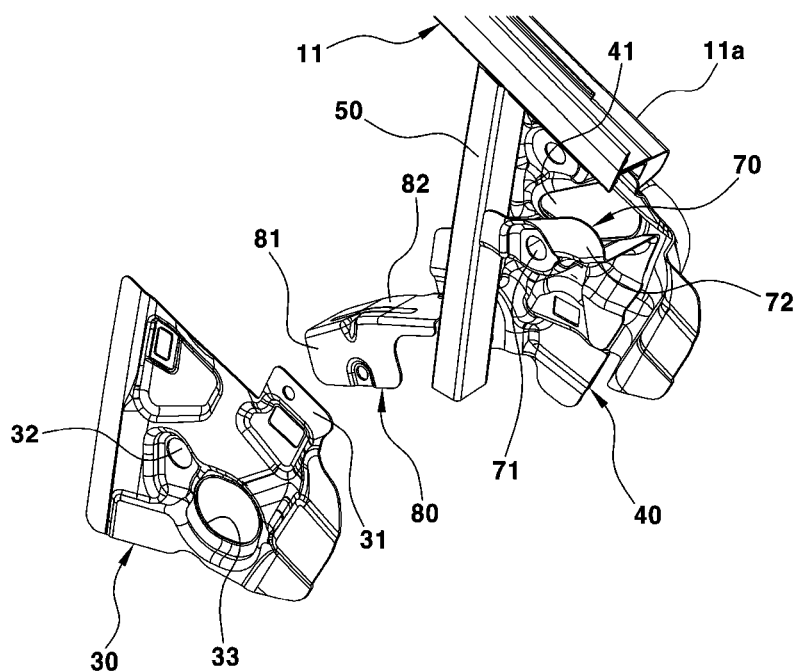
FIG. 9A is a perspective view illustrating a state in which a delta outer reinforcing panel is separated from the fixing structure according to the exemplary embodiment of the present invention.
Figure 9B:
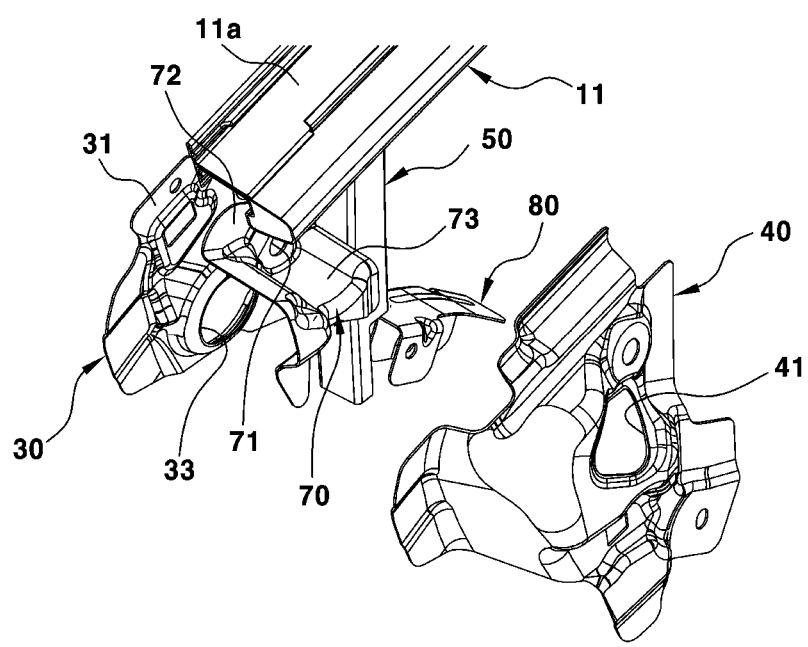
FIG. 9B is a perspective view illustrating a state in which a delta inner reinforcing panel is separated from the fixing structure according to the exemplary embodiment of the present invention.

FIG. 8A is a view illustrating a state in which the fixing structure according to the exemplary embodiment of the present invention is installed when viewing from a door outside position toward the inside, and FIG. 8B is a view illustrating a state in which the fixing structure according to the exemplary embodiment of the present invention is installed when viewing from a door inside position toward the outside. FIG. 9A is a perspective view illustrating a state in which a delta outer reinforcing panel is separated from the fixing structure according to the exemplary embodiment of the present invention, and FIG. 9B is a perspective view illustrating a state in which the delta inner reinforcing panel is separated from the fixing structure according to the exemplary embodiment of the present invention.

First, as illustrated in FIG. 5, a division channel 17 may be installed to be elongated in a vertical direction at a rear side of a door frame 11, and a glass run 15, into which a rear end portion of a door glass 16 may be inserted and guided, may be mounted at a first side of the division channel 17. In particular, a front end portion of a delta glass 19 may be inserted and fixedly supported at a second side of the division channel 17 opposite to the first side of the division channel 17. A C-pillar in the related art, which was formed to extend downward from an upper frame 11*a* of the door frame 11, may be omitted, and the door frame 11 may be manufactured to have a structure in which a rear end of the upper frame 11*a* is cut.

As described above, since it may be difficult or impossible to form a side outer panel, which corresponds to a shape of the C-pillar having a structure steeply bent downward from the upper frame 11*a*, through a molding process, the present invention omits the C-pillar and provides a structure in which the rear end of the upper frame 11*a* is cut, but a structure capable of supporting the delta glass 19 together with the division channel 17 is required, and as a result, the present invention provides a separate fixing structure capable of fixing and supporting a rear end portion of the delta glass 19.

The fixing structure may be configured to fix the delta glass 19 when the fixing structure is integrally fixed to a door inner panel 8, a door outer panel 9, and the door frame 11, and the delta glass 19 may be fixedly mounted between the division channel 17 and a rear channel 18 of the fixing structure. In particular, the front end portion of the delta glass 19 may be inserted into and fixed to the division channel 17, and the rear end portion of the delta glass 19 may be inserted into and fixed to a rear channel 50 of the fixing structure.

The fixing structure according to the exemplary embodiment of the present invention may include a delta outer reinforcing panel 30 fixed to an upper portion of the door inner panel 8 at the rear end portion of the door frame 11 of the rear door 10, a delta inner reinforcing panel 40 fixed to be positioned inside the delta outer reinforcing panel 30, the rear channel 50 which may be installed to be elongated in the vertical direction between the delta outer reinforcing panel 30 and the delta inner reinforcing panel 40 to allow the rear end portion of the delta glass 19 to be inserted into and supported by the rear channel 50, and a delta garnish 60 which may be installed to cover the exterior of the delta outer reinforcing panel 30.

With the aforementioned configuration, a structure of a delta glass type including the delta glass 19 may be applied to the rear door of the vehicle when the fixing structure according to the present invention is applied, and more particularly, a combination of the delta glass 19 and the delta garnish 60 may be provided. The rear channel 50 of the fixing structure according to the present invention may be configured to fix and support the delta glass 19 together with the division channel 17, and the rear end portion of the delta glass 19 may be inserted into and coupled to the rear channel 50 as described above. Accordingly, the delta glass 19, which has the front end portion and the rear end portion inserted into and fixed to the division channel 17 and the rear channel 50, respectively, may be positioned to be fixedly supported in a space between the upper frame 11*a* of the door frame 11, a non-illustrated lower frame, the division channel 17, and the rear channel 50.

Hereinafter, the respective constituent elements of the fixing structure according to the exemplary embodiment of the present invention will be described in more detail. First, the delta garnish 60 defines an external appearance of the fixing structure, and may be assembled to cover the delta outer reinforcing panel 30 from the outside. In particular, the delta garnish 60 may be assembled to be positioned at an upper side of a door outside belt molding 7 (hereinafter, referred to as 'door belt') at the rear end portion of the rear door 10.

Figure 10:
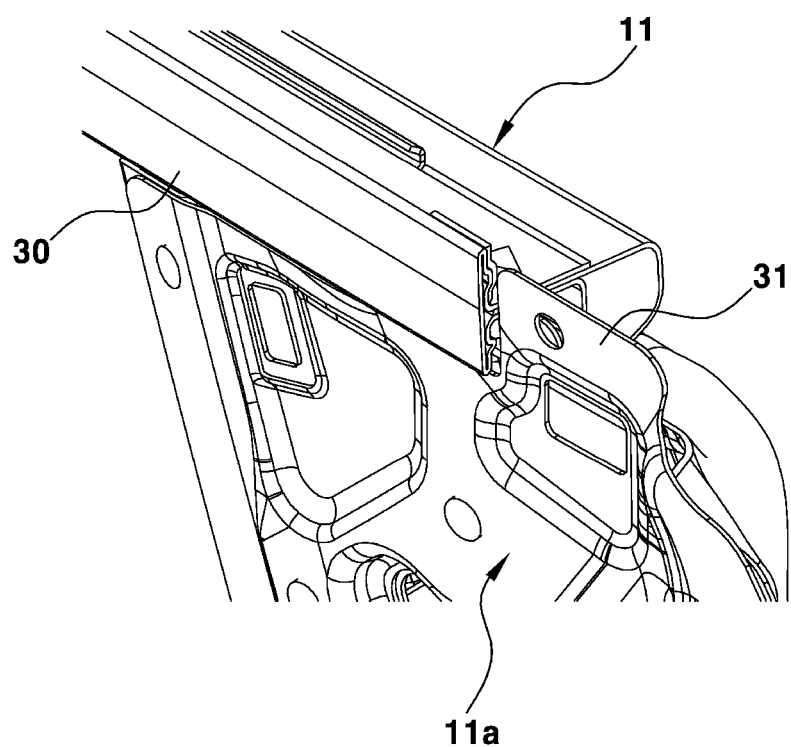
FIG. 10 is a perspective view illustrating a state in which an upper frame of a door frame and a protruding portion of the delta outer reinforcing panel are disposed on the fixing structure according to the exemplary embodiment of the present invention.

The delta outer reinforcing panel 30 may be assembled to be positioned at a lower side of the upper frame 11*a* that is an upper portion of the door frame 11, and a protruding portion 31, having a plate shape protruding upward, may be formed at an upper end portion of the delta outer reinforcing panel 30. In the exemplary embodiment, as illustrated in FIG. 10, the protruding portion 31 of the delta outer reinforcing panel 30 may be disposed to be positioned on an upper frame extended line that extends from the upper frame 11*a* to the cut end portion. Particularly, the plate-shaped protruding portion 31 may be formed to be disposed on the same plane as an outer surface of the upper frame 11*a*.

Figure 12:
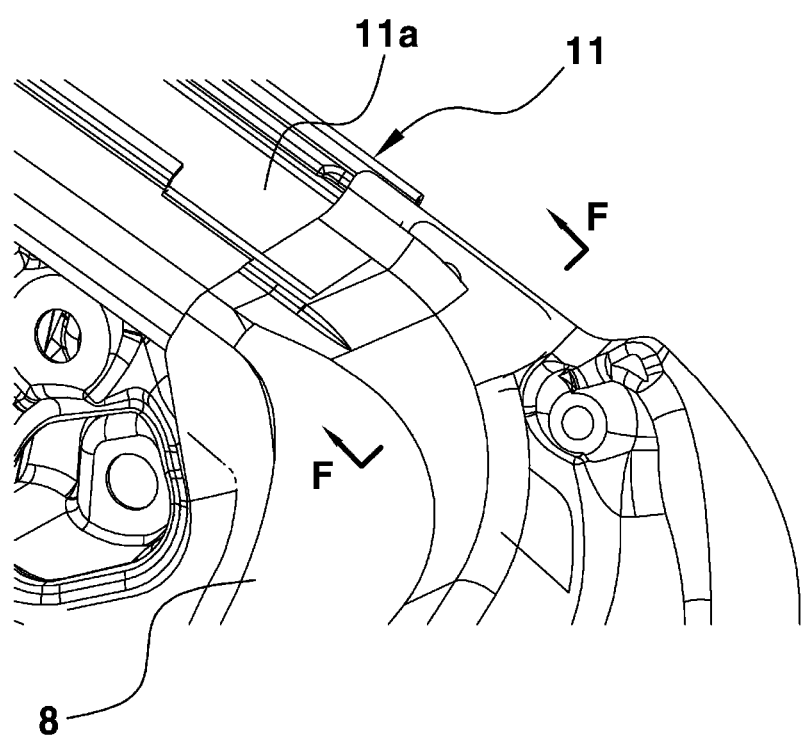
FIG. 12 is a coupled state view illustrating a state in which a door inner panel is coupled to the fixing structure according to the exemplary embodiment of the present invention.
Figure 13:
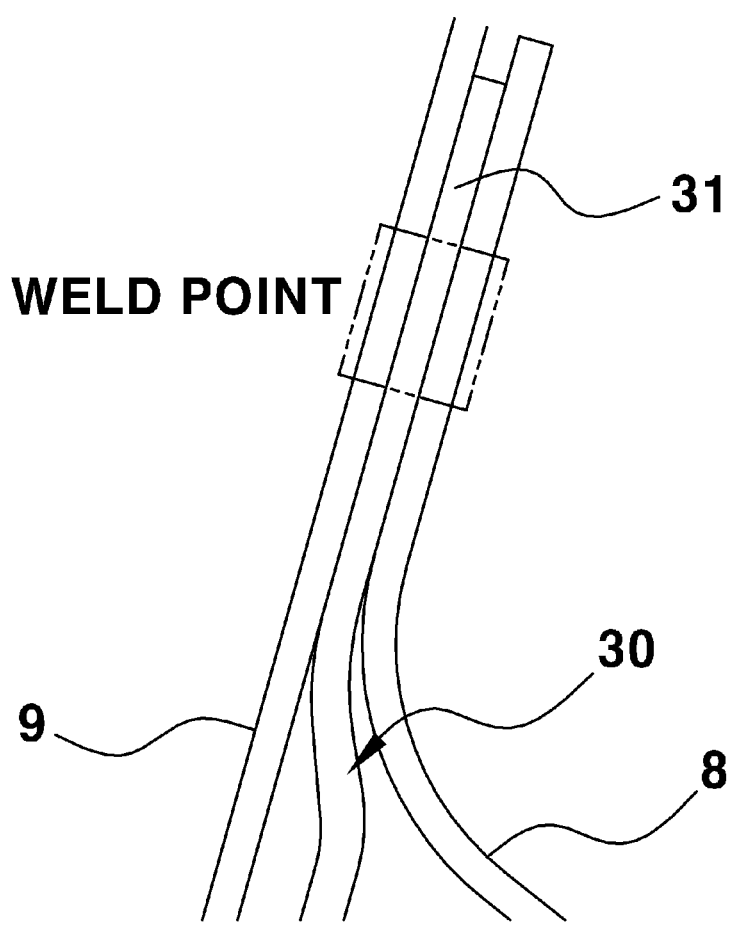
FIG. 13 is a cross-sectional view taken along line F-F of FIG. 12, which is a cross-sectional view illustrating a state in which the protruding portion of the delta outer reinforcing panel, the door inner panel, and the door outer panel are joined in the fixing structure according to the exemplary embodiment of the present invention.

The protruding portion 31 may be coupled to the door inner panel 8 and the door outer panel 9, and defines welding seat surfaces for the door inner panel 8 and the door outer panel 9. In other words, as illustrated in FIG. 13, an upper portion of the door inner panel 8 and an upper portion of the door outer panel 9 may be joined and fixed to both surfaces of the protruding portion 31 of the delta outer reinforcing panel 30 by welding, but is not limited thereto. The panels may be joined by another method known in the art. As illustrated in FIG. 12, the upper portion of the door inner panel 8 may be formed to extend upward and joined to surround the protruding portion 31 of the delta outer reinforcing panel 30 and the cut end portion of the upper frame 11*a*.

As described above, a surrounding structure in which the door inner panel 8 surrounds the end portion of the upper frame 11*a* may be applied, and a triple welding method, which welds the door inner panel 8, the door outer panel 9, and the protruding portion 31 of the delta outer reinforcing panel 30 joined to be interposed between the door inner panel 8 and the door outer panel 9, may be applied, thereby providing an effect of increasing rigidity of the frame and improving a lateral displacement.

Figure 11:
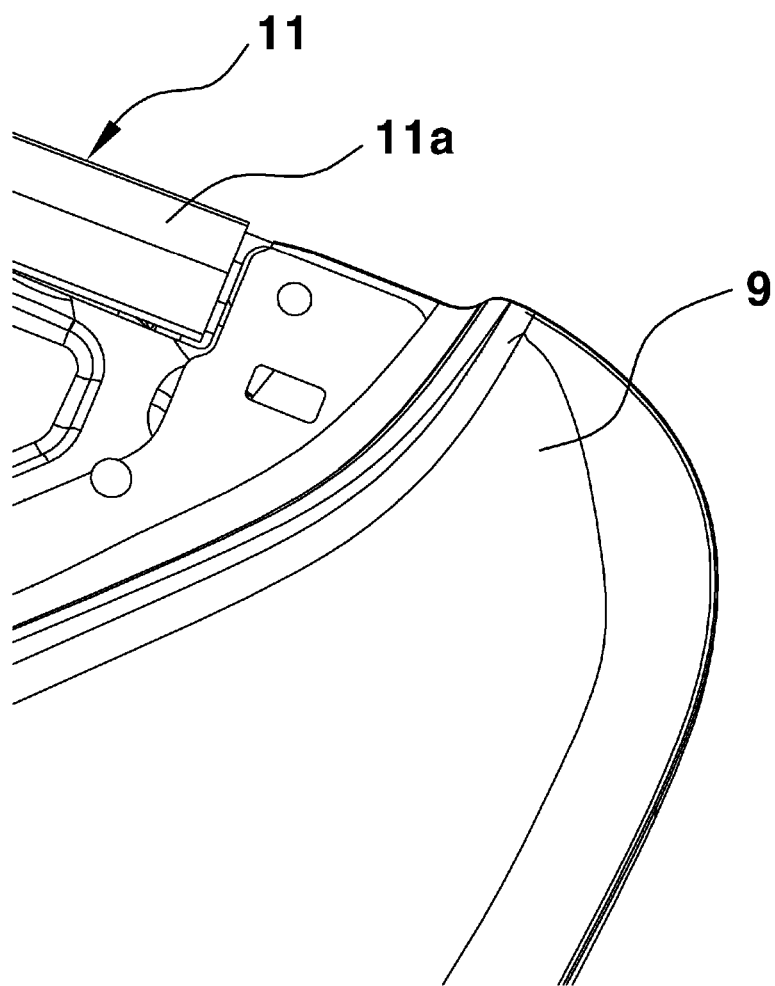
FIG. 11 is a coupled state view illustrating a state in which a door outer panel is coupled to the fixing structure according to the exemplary embodiment of the present invention.

When the surrounding structure is applied, the upper portion of the door outer panel 9 may be joined to the protruding portion (31 in FIG. 11) of the delta outer reinforcing panel (30 in FIG. 10) as illustrated in FIGS. 11 and 13. In addition, an end piece (not illustrated) of the door belt 7 may be fixed to the delta outer reinforcing panel 30 by a fastening device such as a screw, a bolt, or the like, and this configuration will be described below in more detail. The delta inner reinforcing panel 40 is a reinforcing panel fixed to be positioned inside the delta outer reinforcing panel 30, and may form a double layered structure in which the delta outer reinforcing panel 30 and the delta inner reinforcing panel 40 are disposed to doubly overlap each other (e.g., more than one overlapping region) inside and outside.

As described above, by applying the double layered structure in which the delta outer reinforcing panel 30 and the delta inner reinforcing panel 40 are doubly disposed inside and outside, it may be possible to ensure and reinforce support rigidity of the rear channel 50. The delta inner reinforcing panel 40 may form a joint surface joined to a first side of the delta outer reinforcing panel 30, for example, the upper end portion, the lower end portion, or the edge portion of the delta outer reinforcing panel 30, and may be integrated with the delta outer reinforcing panel 30 by welding between the joint surfaces, or may be integrated with the delta outer reinforcing panel 30 by a delta bracket 70 which will be described below.

Reference numerals 33 and 41 in FIGS. 8A, 8B, 9A, and 9B indicate welding tool entry apertures formed to allow a welding tool (welding gun) to enter the delta outer reinforcing panel 30 and the delta inner reinforcing panel 40, and the welding tool (not illustrated) may be inserted through the welding tool entry aperture 33 of the delta outer reinforcing panel 30 to weld the joint surface between the delta bracket 70 and the delta inner reinforcing panel 40. In addition, the welding tool may be inserted through the welding tool entry aperture 41 of the delta inner reinforcing panel 40 to weld the joint surface between the delta bracket 70 and the delta outer reinforcing panel 30.

Figure 14:
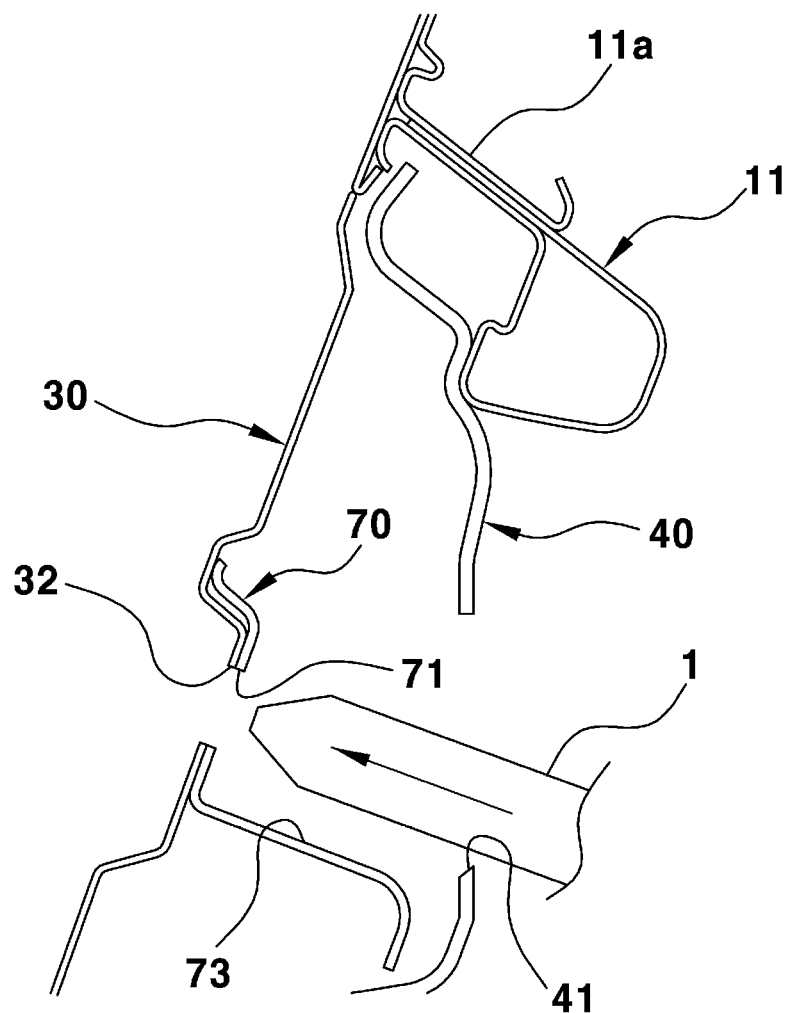
FIG. 14 is a cross-sectional view taken along line E-E of FIG. 8A, which is a view illustrating a state in which a fastening tool enters according to the exemplary embodiment of the present invention.

The welding tool entry aperture 41 of the delta inner reinforcing panel 40 may be used as a tool entry aperture for fastening the end piece of the door belt 7 to the delta outer reinforcing panel 30 using a screw (see FIG. 14). Further, the rear channel 50 may be installed in a gap between the delta outer reinforcing panel 30 and the delta inner reinforcing panel 40, and inserted and installed to be vertically elongated at a position where the rear end portion of the delta glass 19 may be inserted into the rear channel 50, that is, between the front end portion of the delta outer reinforcing panel 30 and the front end portion of the delta inner reinforcing panel 40.

Particularly, the rear channel 50 may be fixed to the delta outer reinforcing panel 30 and the delta inner reinforcing panel 40 by welding, a well-known fastening device such as a screw, a bolt, a nut, and a fastener, an adhesive, and any other fixing method or coupling structure that may integrally combine the rear channel 50, the delta outer reinforcing panel 30, and the delta inner reinforcing panel 40. Further, a fastening aperture 32 for fastening the door belt 7 may be formed in the delta outer reinforcing panel 30, and the fastening aperture 32 may be used to fasten the end piece of the door belt 7 to the delta outer reinforcing panel 30 during a process of installing the door belt 7.

In addition, the end piece of the door belt 7 may be joined to the outer surface of the delta outer reinforcing panel 30 and then fastened by a fastening device such as a screw through the fastening aperture 32, and the screw fastening may be performed inside the delta outer reinforcing panel 30. Accordingly, the welding tool entry aperture 41 of the delta inner reinforcing panel 40 may be used as a tool entry aperture for allowing a fastening tool 1 to enter a space between the two reinforcing panels 30 and 40, and as illustrated in FIG. 14, the fastening tool 1 coupled to a screw may be inserted and may enter through the welding tool entry aperture 41, and the screw may be inserted through the fastening aperture 32 of the delta outer reinforcing panel 30 and fastened to the end piece.

Moreover, as illustrated in FIGS. 9A, 9B, and 14, the fixing structure according to the present invention may further include the delta bracket 70 fixedly installed in the space between the delta outer reinforcing panel 30 and the delta inner reinforcing panel 40. The delta bracket 70 of the fixing structure according to the present invention may be installed to prevent the screw, which is a hardware component (fastened to the end piece of the door belt) for fastening the door belt 7 and the delta outer reinforcing panel 30, from being dropped when the screw is inadvertently withdrawn from the tool 1 during the fastening operation.

The delta bracket 70 may be fixedly installed on the surfaces of the two delta reinforcing panels 30 and 40, which face each other, by welding or another similar method, and a joint portion 72, joined and fixed to the surface of the delta outer reinforcing panel 30 by welding or the like, may be formed at an upper portion of the delta bracket 70. In particular, an aperture 71, which coincides with (e.g., corresponds to the position of) the fastening aperture 32 of the delta outer reinforcing panel 30 for fastening the door belt 7 in a joined state, may be formed in the joint portion of the delta bracket 70. A lower portion of the delta bracket 70 may also be joined and fixed to the surface of the delta inner reinforcing panel 40 by welding or the like.

The delta bracket 70 may include a blocking portion 73 formed to connect the two reinforcing panels 30 and 40 approximately in inward and outward directions based on a direction of a vehicle body at the lower sides of the fastening aperture 32 and the aperture 71 (e.g., through-hole), and the blocking portion 73 of the delta bracket 70 may divide the space between the two reinforcing panels 30 and 40 into an upper space and a lower space. In particular, the blocking portion 73 may be positioned at the lower side of the fastening aperture 32 of the delta outer reinforcing panel 30.

Accordingly, when the screw, which may first be coupled to the tool 1 to be fastened to the end piece of the door belt, my be separated and dropped from the tool 1 due human error when the tool 1 enters the space between the two reinforcing panels 30 and 40 through the welding tool entry aperture 41 of the delta inner reinforcing panel 40 during the operation of fastening the door belt, the screw may be dropped and disposed on the blocking portion 73 of the delta bracket 70. Therefore, the screw dropped on the blocking portion 73 may be picked up, coupled the screw to the tool 1 again, and then fastened to the end piece positioned outside through the fastening aperture 32 of the delta outer reinforcing panel 30.

As described above, the delta bracket 70 may be installed for ease of work, and may prevent the screw from being dropped downward to allow a worker to more easily perform work, and contributes to an improvement on workability and assembly properties. Further, the fixing structure according to the present invention may further include a guide bracket 80 configured to the delta glass 19, which is moved to an accurate assembling position, when the guide bracket 80 supports the delta glass 19 during mounting of the delta glass 19.

Figure 15:
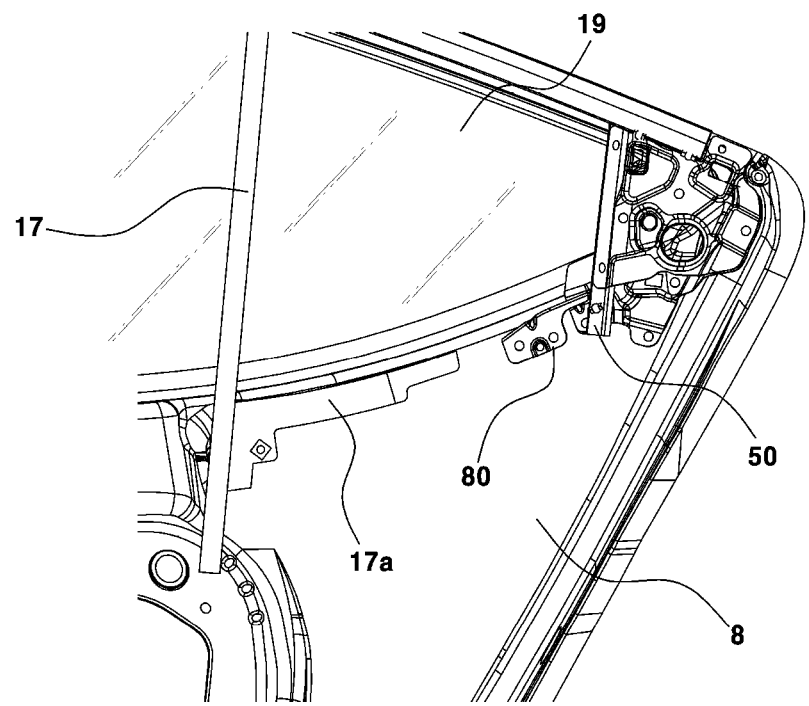
FIG. 15 is a view illustrating a state in which a division channel and a guide bracket according to the present invention are installed according to the exemplary embodiment of the present invention.
Figure 16:
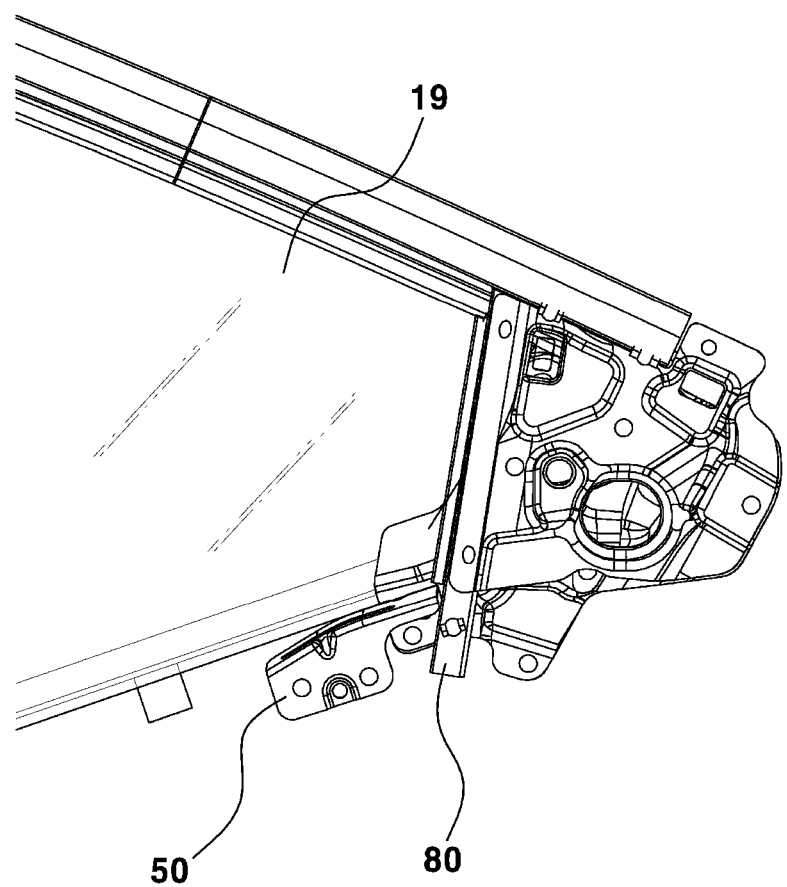
FIG. 16 is a view illustrating a state in which a delta glass is installed and fixed by the fixing structure according to the exemplary embodiment of the present invention.

Particularly, the guide bracket 80 may be installed to support the lower end portion of the delta glass 19 and improve work convenience for the delta glass 19, and as illustrated in FIGS. 15 and 16, the division channel 17 may be mounted on the door inner panel 8 by a mounting bracket 17a, and the guide bracket 80 may be additionally installed at a position where the lower end portion of the delta glass 19 may be supported. The guide bracket 80 may be mounted to be fixed to the door panel, more particularly, the door inner panel 8 by a well-known fastening device such as a screw, a bolt, a nut, or a fastener, or by welding.

In addition, a support portion 82, which may have a shape bent in an approximately horizontal direction, may be formed at an upper portion of the guide bracket 80, that is, at an upper side of a joint portion 81 joined and fastened to the surface of the door inner panel 8. The support portion 82 is a portion on which the delta glass 19 being assembled may be seated, and when the delta glass 19 is seated on the support portion 82 of the guide bracket 80 and then moved rearward during the work, manufacturing, or assembly, the support portion 82 may be positioned at a height at which the rear end portion of the delta glass 19 may be inserted into the rear channel 50. As described above, the worker may more easily complete the assembly when the worker allows the delta glass to be seated on the guide bracket 80 first and pushes the delta glass to an accurate assembling position during a process of assembling the delta glass 19, instead of a manner in which the worker manually holds the delta glass 19 and inserts the delta glass 19 into an assembling position.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A structure for fixing a delta glass for a vehicle, comprising:
   a delta outer reinforcing panel fixed on an upper portion of a door inner panel at a rear end portion of a door frame;
   a delta inner reinforcing panel fixed to be positioned inside the delta outer reinforcing panel;
   a rear channel installed between the delta outer reinforcing panel and the delta inner reinforcing panel to allow a rear end portion of the delta glass to be inserted into and supported by the rear channel;
   a delta garnish installed to cover an exterior of the delta outer reinforcing panel, and a delta bracket connected to the delta outer reinforcing panel and the delta inner reinforcing panel,
   wherein the delta glass is fixed between the rear channel and a division channel installed on the door frame,
   wherein the door frame has a structure in which an end portion of an upper frame of the door frame includes a slot at a rear end portion of the door frame, and the upper portion of the door inner panel extends to surround the slot of the end portion of the upper frame and is directly joined to the end portion of the upper frame;
   wherein the upper frame of the door frame extends above the delta glass.

2. The structure of claim 1, wherein when the delta outer reinforcing panel is positioned at a lower side of the upper frame, a protruding portion, joined and fixed to the upper portion of the door inner panel, is formed at an upper end portion of the delta outer reinforcing panel.

3. The structure of claim 2, wherein the door frame has a structure in which the end portion of the upper frame of the door frame includes the slot at the rear end portion of the door frame, and the protruding portion of the delta outer reinforcing panel is positioned on an upper frame extended line that extends from the upper frame to the slot of the end portion.

4. The structure of claim 2, wherein the protruding portion of the delta outer reinforcing panel comprises a plate to join and fix the upper portion of the door inner panel to a first surface of the protruding portion and to join and fix an upper portion of the door outer panel to a second surface of the protruding portion.

5. The structure of claim 1, further comprising:
   a guide bracket mounted on the door inner panel to support a lower end portion of the delta glass.

6. The structure of claim 5, wherein the guide bracket is installed at a height at which the rear end portion of the delta glass is inserted into the rear channel when the delta glass is moved rearward during assembly of the delta glass.

7. The structure of claim 5, wherein the guide bracket includes a joint portion which is a portion joined and fixed to the door inner panel, and a support portion which has a shape bent in a horizontal direction at an upper side of the joint portion and on which the delta glass is seated.

8. The structure of claim 1, wherein a fastening aperture for fastening a door outside belt molding is formed in the delta outer reinforcing panel, and the delta outer reinforcing panel and the door outside belt molding are fastened and fixed through the fastening aperture.

9. The structure of claim 8, wherein a tool entry aperture, into which a tool for fastening the door outside belt molding is inserted to enter a space between the delta inner reinforcing panel and the delta outer reinforcing panel, is formed in the delta inner reinforcing panel.

10. The structure of claim 8, wherein the delta bracket includes a blocking portion which divides the space between the delta outer reinforcing panel and the delta inner reinforcing panel into an upper space and a lower space, and the blocking portion is positioned at a lower side of the fastening aperture.

11. The structure of claim 8, wherein a welding tool entry aperture, into which a welding tool for welding the delta bracket and the delta inner reinforcing panel is inserted to enter the space between the delta inner reinforcing panel and the delta outer reinforcing panel, is formed in the delta outer reinforcing panel.

12. The structure of claim 8, wherein a welding tool entry aperture, into which a welding tool for welding the delta bracket and the delta outer reinforcing panel is inserted to enter the space between the delta inner reinforcing panel and the delta outer reinforcing panel, is formed in the delta inner reinforcing panel.

* * * * *